United States Patent [19]

Burnett

[11] 4,342,383
[45] Aug. 3, 1982

[54] METHOD AND APPARATUS FOR CONTROLLING THE FALL OF GRAIN THROUGH A CONDUIT

[76] Inventor: William C. Burnett, 6229 Malloch Dr., Memphis, Tenn. 38138

[21] Appl. No.: 141,154

[22] Filed: Apr. 17, 1980

[51] Int. Cl.³ .............................................. B65G 11/20
[52] U.S. Cl. ......................................... 193/32; 138/46
[58] Field of Search ....................... 406/32, 20, 21, 40, 406/157, 159, 160, 163, 195; 137/847, 846, 849; 138/46; 193/32; 222/544, 547, 564, 566

[56] References Cited

U.S. PATENT DOCUMENTS

| | | | |
|---|---|---|---|
| 1,231,778 | 7/1917 | Nall | 406/32 X |
| 1,820,297 | 8/1931 | Butler | 406/32 X |
| 2,035,329 | 3/1936 | McPhail | 221/544 X |
| 2,094,707 | 10/1937 | Jones | 251/10 |
| 2,617,531 | 11/1952 | Palmer | 209/147 |
| 2,649,272 | 8/1953 | Barbato | 251/18 |
| 2,976,676 | 3/1961 | Kress | 60/35.6 |
| 3,223,215 | 12/1965 | Budjinski et al. | 193/32 |
| 3,794,386 | 2/1974 | Hite | 406/157 |
| 3,923,210 | 12/1975 | Jackson | 222/494 |

FOREIGN PATENT DOCUMENTS 69669 8/1958 France .................................. 193/32

Primary Examiner—Robert B. Reeves
Assistant Examiner—Gene A. Church
Attorney, Agent, or Firm—Wood, Herron & Evans

[57] ABSTRACT

The velocity of grain falling in an inclined conduit is prevented from attaining a damaging rate by a variable accumulator and gate. The apparatus is responsive to the volumetric rate of flow of the grain, to accumulate and accommodate surges in the rate of flow of the falling stream. A densified discharge stream is established, with lower dust emission upon discharge.

17 Claims, 7 Drawing Figures

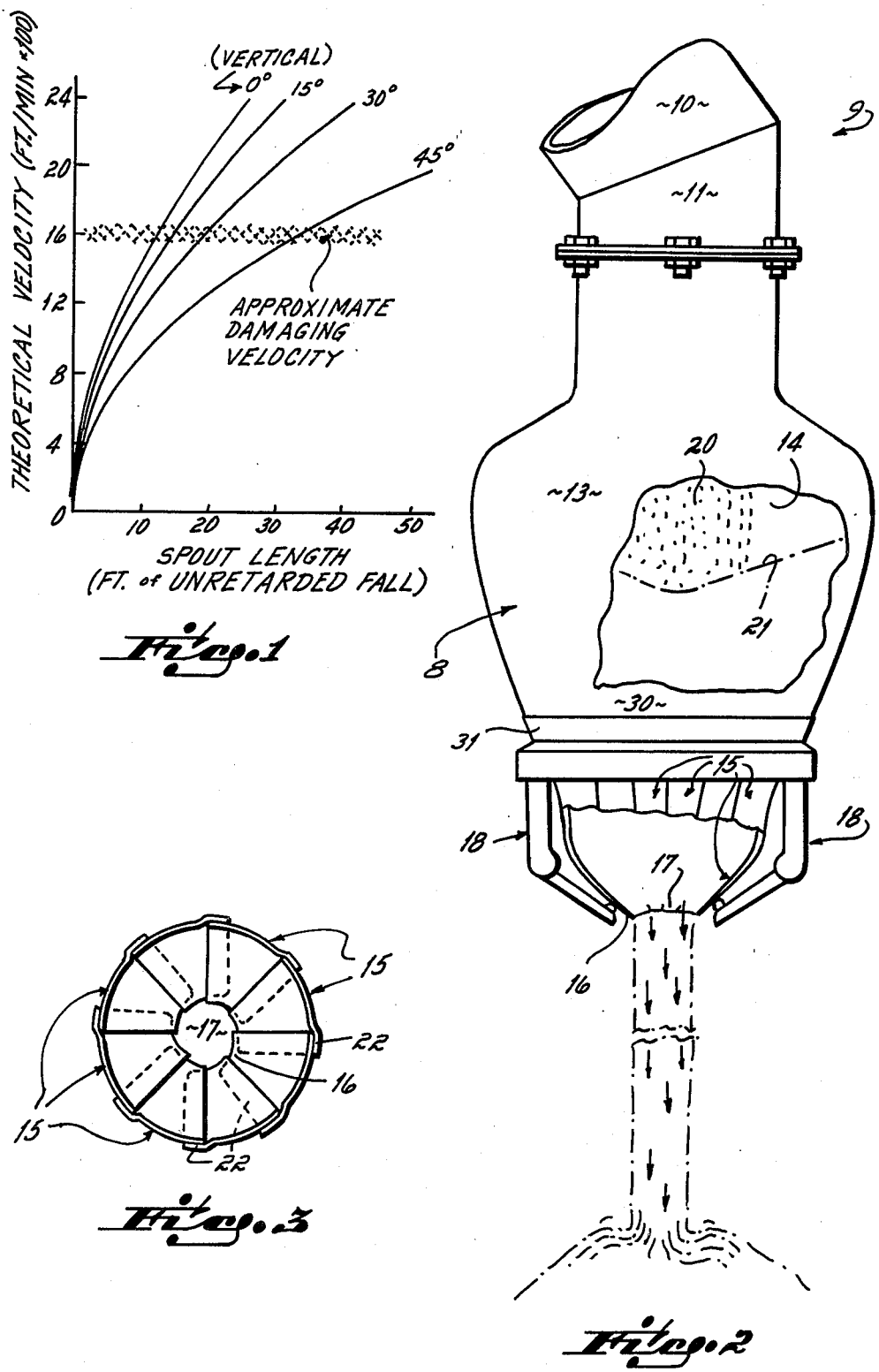

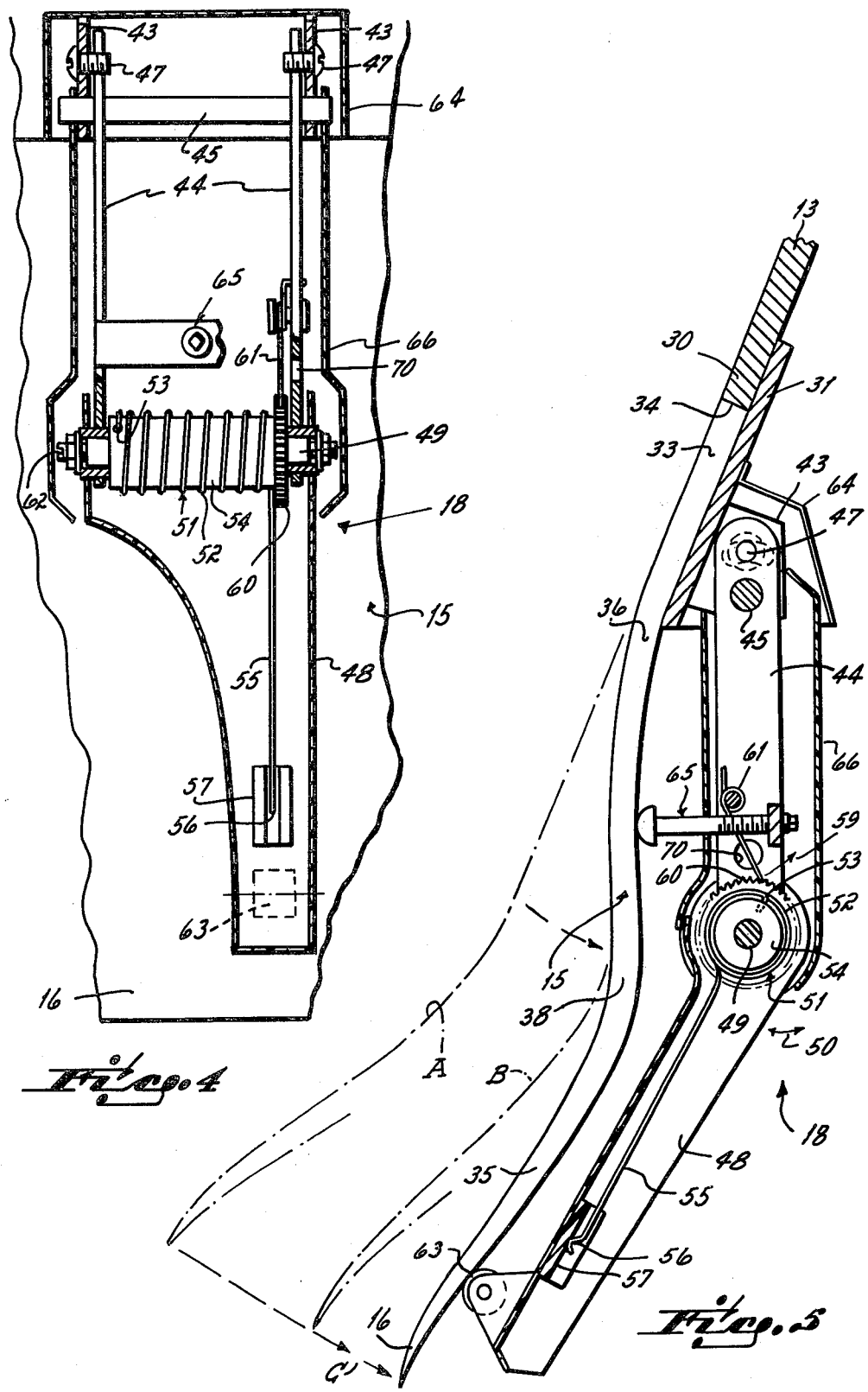

METHOD AND APPARATUS FOR CONTROLLING THE FALL OF GRAIN THROUGH A CONDUIT

RELATED APPLICATION

This application is related to the co-pending application of William C. Burnett and John D. Adams, Ser. No. 941,382, filed Sept. 12, 1978, titled "Method and Apparatus for Low-Dust Discharge of Particulate Material Through a Nozzle," now U.S. Pat. No. 4,203,535, issued May 20, 1980.

BACKGROUND

It is known that grain is degraded as a result of falling at high velocity. The damage occurs both during fall in a downwardly inclined conduit, as well as upon impact after discharge from the conduit. The damage is apparently caused by particle-to-conduit abrasion and particle-to-particle impact, and causes fines and dust.

It is also known that there exists a particular fall velocity above which the affect on the quality and value of the grain becomes unacceptable. This "damaging velocity" can vary with the type and density of the grain, its dryness, and the type of conduit, but in many cases it is in the vicinity of about 1600 feet per minute. If in falling through a conduit the velocity of the grain exceeds the threshold of damage rate for that stream, grain quality is affected to an unacceptable degree.

The velocity increase is of course most rapid in a vertical conduit, but even in a slanting conduit, velocities of several hundred feet per minute are attained in a few feet. A free-falling stream tends to reach a terminal velocity because the air currents cause turbulence within an unconfined stream; but streams in conduits can reach velocities well above terminal velocities upon discharge. In a long conduit, velocity of the stream can exceed even two thousand feet per minute. The damaging value is apparently not highly dependent on the angulation of the conduit; that is, the damaging velocity is roughly the same for a given stream whether it is falling in a vertical conduit or an angulated conduit.

For a given type of grain, a velocity of 1600 feet per minute, which as noted is the approximate damaging velocity in many cases, may be attained in a vertical spout in roughly a 12 foot drop; in a spout angulated at 30° to vertical, that damaging velocity is attained in a run about 18 feet long (corresponding to a 15 foot drop); and in a spout which is angulated at 45° that damaging velocity is attained in a spout about 33 feet long. It will be appreciated that conduits of those lengths or more are common in most grain handling facilities. The same phenomenon of unreasonable damage to the material as the result of high conduit velocities also arises with other materials than grain, although it is most important in respect to grain because of the relative frangibility and layered structure of grain kernels.

To prevent a falling particulate stream from exceeding damaging velocity, the most straightforward approach is to limit the distance of the drop or to angulate the conduit so that the velocity increase is less. However, it is difficult to avoid the need for a substantial elevation change in many instances, as for example in loading grain into the hold of a ship.

It is also possible to impose a flow restrictor in the path of the falling grain to slow its passage. So called "dead boxes" are known for that purpose, which comprise a narrow fixed throat section which can be mounted directly in the conduit. However, dead boxes are really effective only in those situations where the grain flow rate (i.e., bushels per hour) is constant within a relatively small range and where there are no "surges." That is not usually the case. In the general situation, surges—abrupt increases in flow rate, followed by decreases—occur repeatedly. Surging occurs, for example, when a conveyor bucket empties into the upper end of the spout; a period of lower flow may follow, until another bucket refills the chute. Non-uniform moisture content is another cause of surges.

I have observed that where the flow is uneven, use of a fixed restrictor to retard flow is of little effect. In periods of low flow rate, the small stream passes almost unrestrained through the throat opening; and at periods of heavy flow, a "head" of grain builds up rapidly above the throat. This can cause bridging or clogging which can choke off flow completely.

BRIEF DESCRIPTION OF THE INVENTION

I have discovered a method and apparatus for reducing the fall velocity of grain in inclined conduits, vertical as well as angulated to vertical, by which the velocity can be prevented from exceeding the damaging value even under widely varying flow rates, and which moreover reduces the dust emitted when the grain is discharged from the end of the conduit.

The apparatus of this invention comprises a variable accumulator and gate which is responsive to the rate of flow of the stream, and which reduces its velocity without causing clogging or bridging. This is achieved by the provision of a conical or slanting variable throat having an outlet opening area substantially smaller than the cross section of the incoming stream and which establishes an accumulation of grain above the gate. The accumulation rises, and its weight increases, as incoming flow rate increases. The weight of this accumulation is sensed and the area of the opening is increased as the weight increases, in order to provide for an increased rate of release of grain through the gate. Under normal conditions the gate slows the velocity nearly to zero at the point of accumulation; but since the accumulation is discharged more rapidly as it builds, the danger of bridging or clogging is reduced. This is especially important where high moisture content grain is being handled.

More specifically, the invention comprises a support or body, preferably in a "turnip shape," which is mountable to the end or within the length of a downwardly inclined conduit through which grain falls in use. An array, preferably conical or funnel-like in axial section, of downwardly and inwardly sloping blades is supported by the support. The blades have lower ends which define an opening between them, the opening having an area that at its maximum is substantially smaller than the area of the conduit. The overlapping blades are angulated inwardly so that they deflect the grain particles centrally as they fall. The inward deflection of the particles toward the smaller area of the throat causes a mass of grain particles to accumulate above the blades and over the opening in an accumulation chamber which may be within the gate body. The stream falls into this accumulation chamber at high velocity, i.e., in excess of about 1000 feet per minute. Variable biasing means act on the blades to urge them inwardly, and the biasing means is responsive to the weight of the accumulated mass of the particles to provide a larger opening as the weight increases, thereby to release particles more rapidly from the accumulation space above the blades, and to reduce the area of the opening as the weight of particles decreases. The blades biasing means preferably comprises a torsion spring which acts on each blade adjacent the lower end thereof. Alternatively, it is contemplated that other load or flow rate-responsive biasing means can be used, such as hydraulic or pneumatically operated pistons operated by means which senses the head height in the accumulation chamber.

The invention can best be further described by reference to the accompanying drawings in which:

FIG. 1 is a diagrammatic illustration in the form of a chart showing the velocity, in terms of feet per minute, attained by a stream of grain falling in a spout, as a function of spout length in terms of feet of unretarded fall distance for spouts of different degrees of inclination;

FIG. 2 is an elevation, partly in section and somewhat diagrammatic, showing an inclined conduit with a variable accumulator and gate in accordance with a preferred embodiment of the invention mounted to the lower end of the conduit, showing the accumulation of grain above the blades and the discharged stream of grain as it piles up below;

FIG. 3 is a plan view of the array of blades;

FIGS. 4 and 5 are enlarged vertical sections of a preferred form of blade biasing means for use with a gate of the type shown generally in FIGS. 2 and 3;

Figure 6:
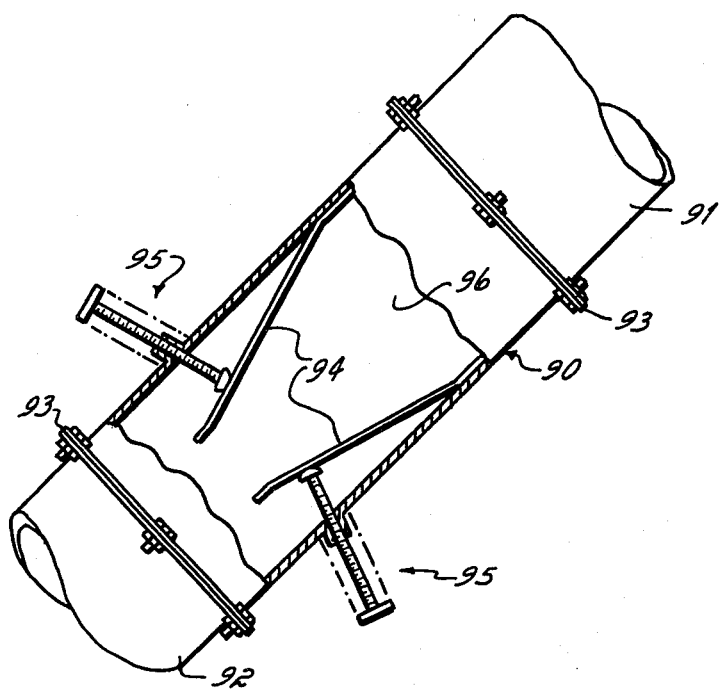
FIG. 6 is an elevation, partly in section, showing a modification of the invention in which a gate is mounted within a long conduit, rather than at the end thereof.

In FIG. 1 the velocity (expressed in terms of feet per minute) attained by a stream of whole dry corn kernels, having a repose angle of 28°, falling in a smooth metal conduit, is shown as a function of the unrestricted length of the spout in which it is moving, for various spout angulations. As can be seen, for a given spout length the grain velocity diminishes with increasing spout angulation from vertical; but even at a 45° spout angulation the velocities are generally more than half those achieved in vertical spouts, regardless of length. For this material the damaging velocity is about 1600 feet per minute (about 27 feet per second), as indicated by the cross-hatched area. Above this approximate velocity, unacceptable grain damage occurs, regardless of spout angulation. Thus, for grain falling in a vertical spout, a drop of more than about 11 feet tends to cause damage. This 1600 ft/min. damaging velocity is applicable to many common types of grain, but it is not intended to be taken as an absolute value for all types of grain under all conditions, and may vary with the nature of grain, its dryness, conduit surface, and so on. The numbers given are intended as illustrative rather than limiting.

FIG. 2 illustrates a velocity retarder or variable accumulator and gate, generally designated by 8, in accordance with a preferred form of this invention, as attached to the discharge end of an inclined spout 9 wherein the spout includes an angulated run 10 and a vertical end run 11. The retarder 8 is mounted at the lower end of the conduit and includes a turnip-shaped hollow body 13 of larger diameter than conduit run 11. The body provides an internal accumulation space 14. A series or array of downwardly and inwardly inclined, movable blades, each designated by 15, is mounted around the lower end of the gate body 13, the blades having lower ends 16 which define a central opening 17 between them. The blades are biased inwardly (i.e., toward the axis of the conduit or body) by biasing means in the form of spring biasing means 18 in the preferred embodiment shown, which urge their lower ends 16 together and thereby tend to reduce the area of opening 17. It is desirable that the blades not entirely close the central opening, so as always to present at least a minimum opening area, thereby to make the chamber self-emptying. The blades 16 are preferably molded of a flexible, resilient material such as polyurethane, use of which is preferred because it is highly abrasion resistant and at the same time minimizes damage to the grain particles as they impinge and move past it. Alternatively, the blades may be made of metal or another rigid material.

A stream of grain 20 falling in conduit 10, 11 drops directly into the conical accumulation space or chamber 14. At this point the velocity of the stream should exceed 1000 feet per minute, for most effective results. The cross-sectional area of outlet opening 17 is smaller than the sectional area of conduit 10,11, so that a mass of grain tends to accumulate as at 21, in the accumulation chamber 14 above the blades. The accumulation reduces the velocity of the grain to a low value, not necessarily zero but much lower than its velocity entering chamber 14. The mixture in this area is essentially unsegregated, that is, the fines and coarser particles are randomly distributed, in contrast to the system as shown in Burnett et al U.S. Pat. No. 4,203,535, previously referred to. As the grain particles move downwardly, the blades deflect or funnel the particles centrally. Spring biasing means 18 applies an inward biasing force to the lower ends of the vanes or blades 16, a force which increases as the vanes are displaced outwardly by the weight of the accumulated mass 21. A flow surge in conduit 10, 11 causes the weight of the accumulation mass 21 to increase rapidly. The greater downward force on the blades opens them progressively, which in turn increases the blade closing forces that arise from the resiliency of the blade material and/or the biasing means 18. In this more open attitude of the blades, accumulation 21 discharges at a greater flow rate through opening 17, but at lower velocity than the incoming stream.

Where used as a discharge nozzle at the end of a spout, as shown in FIG. 2, the invention not only reduces velocity, but also provides a second advantage in that the dusting that accompanies discharge is reduced.

High velocity flow becomes turbulent and the turbulence in turn sweeps lighter particles out of the stream as dust. By reducing velocity a more laminar type of flow is achieved, with little or no cyclonic swirl or turbulence and, consequently, less dusting.

Apart from the effect of high velocity of itself, variations in the flow rate of a stream discharged through an ordinary spout also tend to increase dusting, in relation to the dusting that accompanies a uniform flow rate at the same velocity. This effect is noted even if a conventional fixed restrictor or dead box is employed. The outlet opening of a dead box is constant in size, regardless of the flow rate through it. Where flow rate varies between surges and periods of low flow, the low rate stream through a fixed outlet area is less dense, and hence is more affected by the air through which it passes. Because the blades of the present invention "constrict" the flow regardless of rate, the discharged stream is "densified" to a tighter (smaller) column, and thus is less exposed to the rush of air.

Apart from the effect as to reducing velocity and turbulence, the invention provides still another unexpected benefit. Because of the denser, more compact nature of the stream, its downward momentum is concentrated on a smaller area at the point of impact into the pile below. As a result the incoming particles tend to bury themselves in a crater, and the sides of the crater "cave in" around the column to smother the dust particles which would otherwise swirl off from the point of impact, as shown in FIG. 2. In comparison to grain discharged through a pipe without this flow restrictor, or with a conventional dead box, significantly less dusting is noticed.

The patent of Burnett et al, No. 4,203,535, shows a dust reducing nozzle wherein a deflector or thrower is positioned above a variable gate. In that apparatus the incoming stream falls on the deflector which deflects it outwardly and thereby slows its downward velocity. Thrown outwardly from the deflector, the particles drop 1-2 feet (and hence are at low velocity) when they fall into an accumulation space above the gate. The stream is therefore segregated with finer particles on the inside of the column and coarser particles on the outside. The particles are accumulated directly below the deflector; the gate has no substantial velocity reducing effect, because this downward velocity of the particles has already been reduced by the deflector above the gate. It was not originally appreciated that the gate by itself, in the absence of the deflector and subjected to a high velocity incoming stream, presented surprising advantages in respect to dust minimization and velocity retarding in and of itself, that is, without the deflector.

FIGS. 3, 4 and 5 illustrate the details of a preferred form of blades 15 and spring operated means for biasing the blades. In these figures the lower portion of the conical gate body is shown at 30. A conical band-like gate support ring 31 is mounted to the body 30, extending circumferentially around it. The shape of the blades as seen from above, is shown in FIG. 3. The blades overlap along their lateral edges as at 22, and this overlap is maintained as the blades are bent outwardly. This has been found important to minimize dusting; dust sharply increases if the grain particles can escape between the edges of the blades, rather than through the symmetrical central opening 17. Each blade, one of which is shown at 15, has an upper edge 34 which abuts the body within support ring 31, to which it is secured by means not shown. A lower blade portion 35 is formed to project inwardly at an angle from an upper blade portion 34, a hinge area 38 lying between the blade portions 34, 35. The thickness of lower portion 35 tapers toward the end 16 thereof.

As the weight of particles above them increases, the overlapping blades tend to support one another at their inner ends. The shape of the unstressed blades is shown by the dashed lines A in FIG. 5; they first bend at 36, adjacent their upper ends, to the dashed-line position indicated by the arrow B. As loading further increases, the tips of the blades separate and they bend below the knee 38, in the manner indicated by arrow C, to the solid line position.

The preferred biasing means shown in FIGS. 4 and 5 is of the torsion spring type and is adjustable for changing the blade "rest" position, the bias on the blade at that position, and the rate of increase of the biasing force as the blade bends under load. A biasing means as designated by 18 is provided for each blade, and includes a mounting bracket 43 which is secured by means not shown to support ring 31. A spring support 44 in the form of a U-sectioned channel is pivotally attached to bracket 43 by an axle 45 at its upper end with the spring support 44 depending from bracket 43. The angulation of support 44 is adjustably settable, as for example by screw-in-slot means as indicated at 47, so that the spring support 44 can be set and locked in a given position with respect to vertical (see FIG. 5).

A swingable biasing arm 48 extends from the lower end of spring support 44, to which it is pivotally mounted by an axle 49. Arm 48 can move relative to spring support 44 about a horizontal axis which is tangent to the circumference of the blade. As indicated by the arrow 50 in FIG. 5, swinging movement of arm 48 in the counterclockwise direction tends to move arm 48 away from the center axis of the gate.

Arm 48 is biased inwardly (toward the gate axis) by a torsion spring designated generally at 51 which includes a coil 52 that encircles a spool portion 54 of axle 49. One end of the coil spring is secured to the spool and axle as at 53 for rotation with it. An elongated spring finger 55 projects from coil 52 and outer end 56 which bears upon a wear pad 57 mounted to biasing arm 48. Spring arm 45 thus urges pad 57 and arm 48 clockwise, in FIG. 4.

The biasing force is adjustable to accommodate conduits of different diameters and lengths, and for handling grain of different densities. The force of spring 51 is adjustable by winding up spool 54. To prevent the coil from unwinding, a one-way clutch or ratchet is provided. In the embodiment shown a ratchet wheel 60 is affixed to spool 54, and one end of a locking spring 61 engages the teeth of the ratchet (see FIG. 4) to prevent ratchet and spool rotation in the counterclockwise direction. To wind the spring and thereby increase the biasing force, the spool can be rotated in the clockwise direction (as seen in FIG. 5) by turning the axle with a screwdriver engaged in an end slot 62 thereof. To release tension locking spring 61 is released from the ratchet by pushing its tip in the direction of arrow 59, out of the path of the teeth. The tip of spring 61 is accessible through a window 70 for this purpose.

At the lower end of arm 48 a roller wheel 63 is provided which rides against the outer surface of the blade. The force of spring 55 is transferred to the arm 48 through wear pad 56 and holds the roller wheel 63 against the blade. A stop 65 may be mounted to spring support 44 to limit the outward flexion of the upper portion 33 of the blade to that position in which it is essentially vertical (i.e., so that it forms a cylinder with the other blades). The biasing means is protected by a two part housing, including an upper cap 64 and a lower cover 66.

In the embodiment shown in FIGS. 2, 4 and 5, the variable accumulator and gate is mounted to a vertical run 11 of a conduit, and the grain is discharged directly from the gate to fall unconfined to a receiver or pile below. FIG. 6 illustrates a modified embodiment of the invention wherein the gate is incorporated in a sloping run of conduit rather than a vertical run, and further wherein, after passing through the gate, the stream is not discharged but rather travels downstream through another conduit run.

The embodiment shown in FIG. 6 includes a generally cylindrical gate body 90 which is mounted between the conduit runs 91 and 92 by flange mounting means 93, 93. The gate blades shown in section at 94 are mounted to the inside of the gate body and overlap one another laterally, not shown in this figure but similar to the manner shown in FIG. 3. The lower ends of the gates are biased inwardly by spring biasing means 95, here shown as direct acting spring loaded plungers. The operation of the velocity retarder shown in FIG. 6 is similar to that of the other embodiments. The weight of the high velocity stream entering the accumulation space 96 above the blades acts on the blades so that they respond by bending outwardly. The gate reduces the velocity of the grain and the stream discharged from the gate opening falls in the lower conduit section 92 at a velocity which is safely below the damaging velocity. In a long run of conduit it is contemplated that two or more of these gates may advantageously be employed at spaced intervals along the length.

Figure 7:
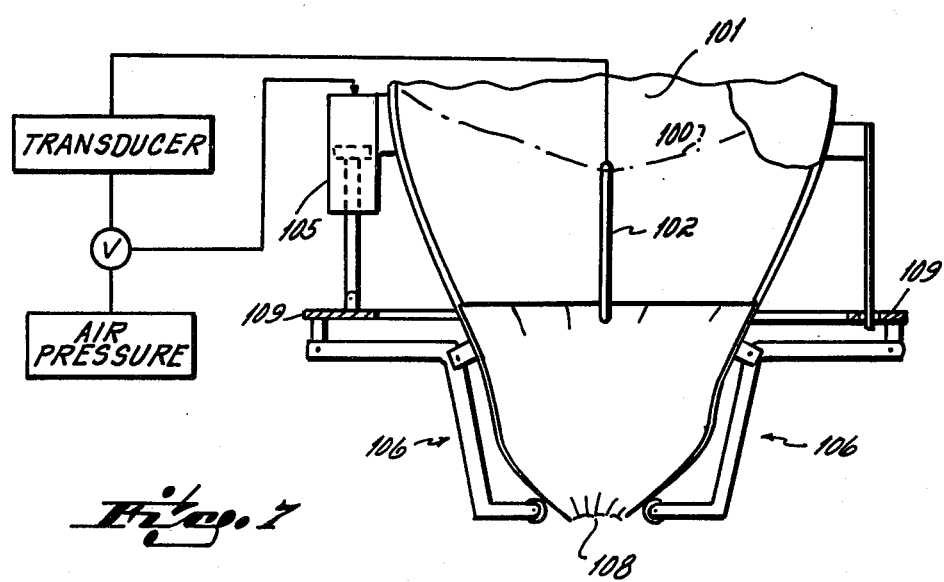
FIG. 7 shows an alternative embodiment of the invention wherein the blades are biased by fluidic pressure responsive to a device which senses head height variations.

In the embodiments above described, the gates have been spring loaded. FIG. 7 illustrates an embodiment in which the gate blades are operated by fluidic pressure, air pressure in this instance. The depth of accumulated grain mass 100 in the accumulation space 101, or "read" is sensed by a depth gauge 102 which may for example be a capacitance type level transmitter such as that sold by Princo Instruments, Inc. of Southampton, Pennsylvania. The depth as indicated by probe 102, is applied to a transducer which operates a valve V to add or release fluid from a cylinder 105 in order to maintain a desired "head." Cylinder 105 vertically positions an annular ring 109 which in turn operates bell crank type biasing means 106 that operates the blades. As the depth of the accumulated mass rises, air is progressively released from cylinder 105 to permit the blades to open progressively; and as the depth diminishes the transducer operates valve V to apply air to cylinder 105 to reduce the discharge opening 108.

It will be appreciated that other sensing means can be used, including motor operated plungers and the like.

In operation, the gate interrupts the flow of grain sufficiently to start to accumulate a head in the chamber. As the head builds up, its weight increasingly opens the gate, until a constant head is maintained. The blades are balanced to a flow rate by the spring adjustment. The output stream is "compacted," as compared to the incoming stream; that is the interparticle spacing is less and it has a greater apparent density. The output stream flows in a tapered, well defined cylindrical form that is typical of laminar flow, with far less dusting than would be obtained in absence of the gate.

Having described the invention, what is claimed is:

1. A method of reducing the velocity of a stream of grain which is falling in a downwardly inclined conduit, said method comprising,
    interposing an array of downwardly and inwardly sloping blades in the path of the falling stream in the conduit at a position in which the velocity of the stream is in excess of about 1000 feet per minute, the blades slowing the movement of the grain particles and deflecting them toward the axis of the conduit,
    providing a central opening between lower ends of the blades,
    yieldably biasing the blades inwardly, in a direction tending to reduce the size of said opening, the blades restricting the fall of the particles and slowing their movement through the central opening so that a mass of particles accumulates above said blades and opening, and
    continuously discharging particles from the accumulated mass through said opening,
    while varying the size of the opening between the blades as the weight of the accumulated mass of particles above said opening changes with flow rate variations, to increase the size of the opening as the weight of the mass increases in response to an increase in the flow rate of the stream, and thereby to release particles from said mass more rapidly as the weight increases.

2. The method of claim 1 including a further step comprising, biasing the blades with a force which increases as the blades are moved outwardly under increasing weight of said mass.

3. The method of claim 1 including a further step comprising, overlapping the blades on one another along their lateral edges and thereby preventing passage of grain between the blades except through said opening, regardless of the size of said opening.

4. The method of claim 1 wherein said blades are interposed in said stream at a lower end of said conduit, and said stream upon discharge through said opening falls without containment, and
    wherein said biasing force is maintained at a level sufficient to slow the discharge velocity of said particles from said opening so that said particles fall therefrom as a laminar stream.

5. The method of claim 1 wherein said blades are interposed in said stream in a run or conduit, and
    wherein said stream after discharge through said opening is again conducted through a downwardly inclined conduit.

6. The method of claim 1 wherein the velocity of said stream, immediately ahead of the point at which it is slowed by said blades, is less than 1600 feet per minute,
    whereby damage to the grain from high velocity fall is reduced.

7. Apparatus for reducing the velocity of a stream of grain which is falling in a downwardly inclined conduit, said apparatus comprising,
    a gate which is mountable to said conduit, comprising a body,
    an array of downwardly and inwardly sloping blades mounted by said body,
    the blades having lower ends which define a central opening between them having an area that is substantially smaller than the area of said conduit,
    means providing an accumulation chamber in the body above the blades and positioned to receive said stream of grain falling directly thereinto from said conduit, the blades being positioned to retard the movement of the grain particles past them to said opening, so that a mass of particles accumulates in said chamber,
    means biasing the blades inwardly but yielding to increase the area of the opening between the blades with increasing weight of the mass of particles in said chamber,
    thereby to maintain a lower velocity, more constant rate of discharge of particles through said opening than entering said chamber,
    said biasing means comprising torsion springs associated with the respective blades, each torsion spring having a finger portion acting on the respective blade near the end thereof and including a coil portion, and means for winding said coil portion to change the biasing force exerted by the finger portion on the respective blade.

8. The apparatus of claim 7 wherein said blades overlap one another along their lateral edges, to block passage of grain past said blades except through said opening.

9. The apparatus of claim 7 wherein said blades collectively define a conical shape.

10. The apparatus of claim 7 wherein said blades are flexible and have a thickness which diminishes from their upper ends to their lower ends.

11. The apparatus of claim 7 wherein said blades are resiliently bendable, the resiliency providing said biasing means.

12. Apparatus for reducing the velocity of a stream of grain which is falling in a downwardly inclined conduit, said apparatus comprising,
 a gate which is mountable to said conduit, comprising a body,
 an array of downwardly and inwardly sloping blades mounted by said body,
 the blades having lower ends which define a central opening between them having an area that is substantially smaller than the area of said conduit,
 means providing an accumulation chamber in the body above the blades and positioned to receive said stream of grain falling directly thereinto from said conduit, the blades being positioned to retard the movement of the grain particles past them to said opening, so that a mass of particles accumulates in said chamber,
 means biasing the blades inwardly but yielding to increase the area of the opening between the blades with increasing weight of the mass of particles in said chamber,
 thereby to maintain a lower velocity, more constant rate of discharge of particles through said opening than entering said chamber,
 means for sensing the depth of the mass of grain in said accumulation chamber, and
 wherein said biasing means is responsive to said sensing means to increase the area of said opening as the depth of the mass of grain in said accumulation chamber increases.

13. The apparatus of claim 12 wherein said biasing means is separate from the blades and acts on them adjacent their lower ends.

14. The apparatus of claim 12 wherein said biasing means comprises spring means.

15. The apparatus of claim 14 wherein said biasing means is piston operated.

16. The apparatus of claim 7 wherein said body is a turnip-shaped hollow body and said blades are mounted to a lower end of said body.

17. The apparatus of claim 7 further including means for mounting a conduit to said gate below said blades, to receive the grain after passing through said opening.

* * * * *